US012801867B2

(12) United States Patent
Ray et al.

(10) Patent No.: US 12,801,867 B2
(45) Date of Patent: Nov. 17, 2026

(54) SWITCHBOARD PLATFORM FOR FOUNDATION MODELS

(71) Applicant: Accenture Global Solutions Limited, Dublin (IE)

(72) Inventors: Atish Shankar Ray, Herndon, VA (US); Sumanth Yamala, Raleigh, NC (US); Paresh Mangesh Wankhede, Edison, NJ (US); Anand Saranath Srinivasa Raghavan, Chennai (IN); Sharath Haikadi Vasudeva Achar, Bangalore (IN); Ekpe Okorafor, Fairview, TX (US); Lan Guan, New York, NY (US); Bo Zhang, San Diego, CA (US); Stephen Randall Bistline, Dublin, CA (US); Niaz Habib, Sugar Land, TX (US); Mason De Lapp, Dallas, TX (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 147 days.

(21) Appl. No.: 18/659,180

(22) Filed: May 9, 2024

(65) Prior Publication Data

US 2025/0348690 A1 Nov. 13, 2025

(51) Int. Cl.
*G06F 40/47* (2020.01)

(52) U.S. Cl.
CPC .................................... *G06F 40/47* (2020.01)

(58) Field of Classification Search
USPC ................................................ 704/7–10, 257
See application file for complete search history.

(56) References Cited

U.S. PATENT DOCUMENTS

2022/0382539 A1 12/2022 Gumashta et al.
2024/0289628 A1* 8/2024 Parmar .................. G06F 40/30
2024/0403419 A1* 12/2024 Parmar ................ G06F 21/554
(Continued)

OTHER PUBLICATIONS

Accenture, "Accenture Launches Specialized Services to Help Companies Customize and Manage Foundation Models," Nov. 30, 2023, 6 pages.[https://newsroom.accenture.com/news/2023/accenture-launches-specialized-services-to-help-companies-customize-and-manage-foundation-models].
(Continued)

*Primary Examiner* — Leonard Saint-Cyr
(74) *Attorney, Agent, or Firm* — Mannava & Kang, P.C.

(57) ABSTRACT

Implementations of the present disclosure provide receiving, by an intelligent router of the switchboard platform, a first request from an application, the first request including at least a portion of a prompt and a set of policy parameters, selecting, by the intelligent router, a foundation model of a sub-set of foundation models at least partially based on at least one policy parameter in the set of policy parameters, determining, from a model registry of the switchboard platform, connection data for the foundation model, transmitting, by the intelligent router and through a model connector of the switchboard platform, a second request for processing by the foundation model, the second request being transmitted using the connection data and including at least a portion of the prompt, receiving, by the intelligent router, a response from the foundation model, and transmitting the response to the application.

17 Claims, 4 Drawing Sheets

(56) References Cited

U.S. PATENT DOCUMENTS

| | | | | |
|---|---|---|---|---|
| 2024/0419925 | A1* | 12/2024 | Ben-Elazar | G09B 17/003 |
| 2024/0428275 | A1* | 12/2024 | Luus | G06Q 30/0631 |
| 2025/0005182 | A1* | 1/2025 | Rodrigo | G06F 21/6218 |
| 2025/0028992 | A1* | 1/2025 | Foley | G06N 20/00 |
| 2025/0117605 | A1* | 4/2025 | De Wynter | G06F 40/30 |
| 2025/0165697 | A1* | 5/2025 | Saleh | G06F 40/166 |
| 2025/0181215 | A1* | 6/2025 | Saleh | G06F 3/0484 |
| 2025/0291842 | A1* | 9/2025 | Park | G06F 16/957 |
| 2025/0310383 | A1* | 10/2025 | Menon | H04L 63/20 |

OTHER PUBLICATIONS

Chattha, T, et al., "Create a Generative AI Gateway to allow secure and compliant consumption of foundation models," AWS Machine Learning Blog,Sep. 28, 2023, 10 pages.
Kraus, Chris, "How to Integrate Generative AI into Your Enterprise," Krista Software, retrieved from the internet Jun. 6, 2024, 18 pages.
Wilson, Chad, "Challenges and opportunities in generative AI for enterprise applications," The Cube(Coverage from SiliconAngle's livestreaming video studio), [https://events.cube365.net/supercloud?utm_source=social&utm_medium &utm_campaign=SAbanner].
Foster, Emily, "Lessons on integrating generative AI into the enterprise," TechTarget's AI Insider Newsletter, Sep. 21, 2023, 5 pages.
Hari, Surya Narayanan, and Thomson, Matt, "Tryage: Real-time, Intelligent Routing of User Prompts to Large Language Models," arXiv:2308.11601v1 [cs.LG] Aug. 22, 2023, 11 pages.
Extended European Search Report for EP Application No. 24195054.2, Feb. 7, 2025, 9 pages.

* cited by examiner

SWITCHBOARD PLATFORM FOR FOUNDATION MODELS

BACKGROUND

Enterprises continuously seek to improve and gain efficiencies in their operations. To this end, enterprises employ software systems to support execution of operations. Enterprises integrate systems in the domain of so-called intelligent enterprise, which can employ artificial intelligence (AI) that can include, for example, machine learning (ML) models. For example, AI can be used for data analytics and/or automating tasks in support of enterprise operations.

In the field of AI, so-called generative AI (GAI) has recently seen an explosion in popularity. GAI can be described as including so-called foundation models that generate content based on training data. For example, foundation models can include large language models (LLMs), which are a form of GAI that can be used to generate text for a variety of use cases. In some examples, LLMs can be integrated in digital assistants (e.g., chatbots) replacing traditional rule-based systems to provide textual responses to user input. GAI can be used to generate a variety of content including, but not limited to text, images, audio, and video. The increasing power and popularity of GAI has seen enterprises seeking avenues to leverage GAI in improving enterprise operations. However, integrating GAI into enterprise platforms is a non-trivial task. For example, GAI can present various technical challenges and can have disadvantages that have to be managed.

SUMMARY

Implementations of the present disclosure are generally directed to a switchboard platform for foundation models. More particularly, implementations of the present disclosure are directed to a switchboard platform that enables intelligent access, routing, and orchestration of foundation models based on various objectives that can include, but are not limited to, model economics, performance expectations, security considerations, and deployment complexities.

In general, innovative aspects of the subject matter described in this specification can include actions of receiving, by an intelligent router of the switchboard platform, a first request from an application, the first request including at least a portion of a prompt and a set of policy parameters, selecting, by the intelligent router, a foundation model of a sub-set of foundation models at least partially based on at least one policy parameter in the set of policy parameters, determining, from a model registry of the switchboard platform, connection data for the foundation model, transmitting, by the intelligent router and through a model connector of the switchboard platform, a second request for processing by the foundation model, the second request being transmitted using the connection data and including at least a portion of the prompt, receiving, by the intelligent router, a response from the foundation model, and transmitting the response to the application. Other implementations of this aspect include corresponding systems, apparatus, and computer programs, configured to perform the actions of the methods, encoded on computer storage devices.

These and other implementations can each optionally include one or more of the following features: the set of policy parameters includes one or more of a tenant identifier, an application identifier, a domain, an intent, a task, and a modality; selecting, by the intelligent router, the foundation model of the sub-set of foundation models at least partially based on the at least one policy parameter in the set of policy parameters includes applying a policy responsive to the first request, and the foundation model conforming to the policy; actions further include, during a pre-production phase, defining criteria, and selecting foundation models of a set of foundation models for inclusion in the sub-set of foundation models based on the criteria; selecting the foundation models of the set of foundation models for inclusion in the sub-set of foundation models based on the criteria includes transmitting requests to the foundation models in the set of foundation models in a first rank order based on cost to query, and determining a second rank order of foundation models that meet the criteria, at least a portion of the foundation models in the second rank order of foundation models being included in the sub-set of foundation models; the connection data includes an endpoint of the foundation model in a model serving infrastructure; and the set of foundation models includes large language models (LLMs).

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
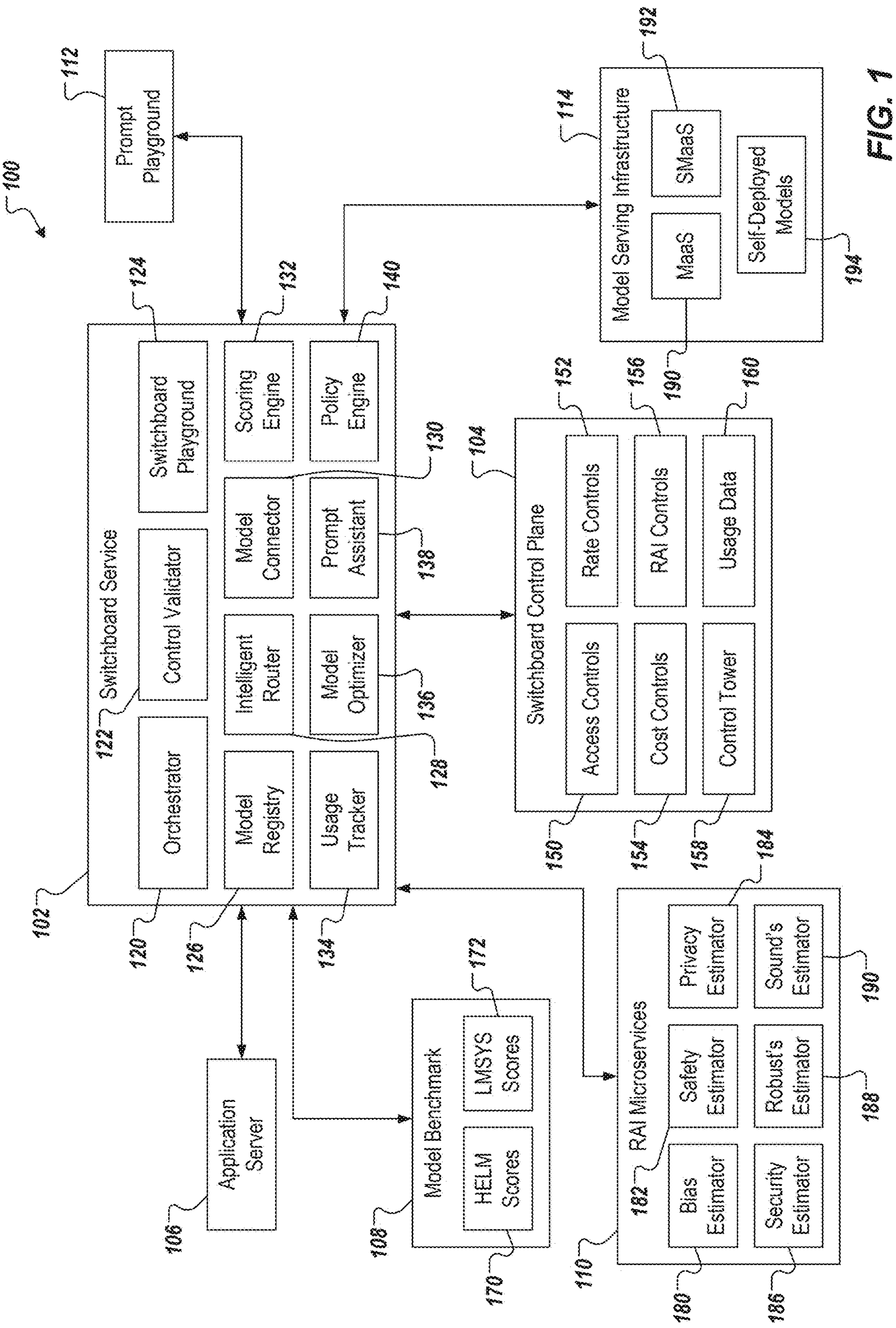
FIG. 1 depicts an example architecture in accordance with implementations of the present disclosure.

Implementations of the present disclosure are generally directed to a switchboard platform for foundation models. More particularly, implementations of the present disclosure are directed to a switchboard platform that enables intelligent access, routing, and orchestration of foundation models based on various objectives that can include, but are not limited to, model economics, performance expectations, security considerations, and deployment complexities.

To provide context for implementations of the present disclosure, and as introduced above, in the field of artificial intelligence, generative AI (GAI) has recently seen an explosion in popularity. At a high level, GAI can be described as foundation models that generate content based on training data. A foundation model can be described as a general-purpose GAI model, such as a large deep learning neural network, that is trained using broad range of generalized, unlabeled training data and that is capable of performing a multitude of general tasks (e.g., generating text, generating images, conversing in natural language, generating video, generating audio). In some cases, applications are built on top of foundation models. In some examples, multiple foundation models can be used to perform a range of functionality for an application.

Foundation models can include, for example, large language models (LLMs), which are a form of GAI that can be used to generate text for a variety of use cases. In some examples, LLMs can be integrated in digital assistants (e.g., chatbots), replacing traditional rule-based systems, to provide textual responses to user input. A LLM can be described as an advanced type of language model that is trained using deep learning techniques on massive amounts of text data. The text data is general and not specific to any particular domain. LLMs can generate human-like text and can perform various natural language processing (NLP) tasks (e.g., translation, question answering). In general, the term LLM refers to models that use deep learning techniques and have many parameters, which can range from millions to billions. LLMs can capture complex patterns in language and produce text that is often indistinguishable from that written by humans. This data is processed through a deep learning architecture, such as a recurrent neural network (RNN) or a transformer model.

While implementations of the present disclosure are described in further detail herein with non-limiting reference to LLMs as example foundation models, it is contemplated that implementations of the present disclosure can be realized using any appropriate foundation models. Example foundation models can include foundation models that generate content based on any appropriate modality (e.g., text, audio, image, video).

Use of foundation models in applications is a non-trivial task, particularly in view of a diverse range of foundation models being available for consumption. More specifically, enterprises can require access to multiple foundation models to meet needs of disparate contexts (application tasks). Different foundation models have different strengths and weaknesses, which can vary between contexts. This makes it difficult to optimize use of foundation models, as optimization depends on specific context. Consequently, for an application interacting with multiple foundation models (in a so-called multi-model GAI paradigm) technical controls are needed. Further, enterprises can require flexibility in applications without a significant coupling to specific foundation models. For example, an ecosystem of an enterprise can evolve over time and, as such, contexts change over time. Additionally, there are multiple factors and considerations for determining the best-fit foundation model for a given context. This requires significant experimentation by each application and, currently, no common standards exist. As such, significant technical resources can be wasted (e.g., over multiple experiments) in an effort to integrate foundation models into enterprise ecosystems. Further, sustainable operationalization of foundation models at enterprise scale requires standardized governance, access, cost, service, and usage management to be in place.

In view of this, implementations of the present disclosure provide a switchboard platform that enables applications to access and interact with multiple foundation models to perform application tasks. More particularly, the switchboard platform of the present disclosure provides context-aware selection and routing of queries (prompts) to the most appropriate foundation model for a given context. As described in further detail herein, the switchboard platform of the present disclosure provides access to foundation models, intelligent routing of requests to foundation models, and management and control functionality.

With regard to access, the switchboard platform of the present disclosure can provide a list of foundation models that are accessible (e.g., as a managed service, through self-managed deployments), can invoke completion and embedding application programming interfaces (APIs) for accessible foundation models, and can invoke multiple, different foundation models within a same context for A/B testing and decision making, for example. With regard to intelligent routing, the switchboard platform of the present disclosure uses a set of technical and functional parameters to recommend foundation models for specific application tasks (context), can route requests to endpoints of the recommended foundation models based on technical parameters (e.g., latency, quota, availability, cost) and/or functional parameters (e.g., prompt complexity, domain, request type, accuracy), and provides fail-over to available endpoints for a foundation model for automatic recovery. With regard to management and control functionality, the switchboard platform of the present disclosure can add, remove, update endpoints of approved foundation models, can configure and manage quota, pool, permissions, and guardrails for the endpoints, monitor and manage endpoint availability and capacity, and can capture usage details including cost and energy consumption. In some examples, the switchboard platform of the present disclosure enables a best-fit foundation model for an application task to be determined from a set of foundation models by, for example, contrasting foundation models and evaluating outcomes in view of the application task. In some examples, the switchboard platform of the present disclosure provides enterprise-specific controls, such that only foundation models that are pre-approved by a respective enterprise are available for enterprise use.

FIG. 1 depicts an example architecture 100 in accordance with implementations of the present disclosure. In the example of FIG. 1, the example architecture 100 includes a switchboard service 102 and a switchboard control plane 104. In some examples, the switchboard service 102 and the switchboard control plane 104 collectively provide at least a portion of a switchboard platform in accordance with implementations of the present disclosure. The example architecture 100 further includes one or more application servers 106, a model benchmark source 108, a set of responsible artificial intelligence (RAI) microservices 110, a prompt playground 112, and a model serving infrastructure 114.

In some implementations, the switchboard service 102 includes an orchestrator 120, a control validator 122, a switchboard playground 124, a model registry 126, an intelligent router 128, a model connector 130, a scoring engine 132, a usage tracker 134, a model optimizer 136, a prompt assistant 138, and a policy engine 140. In some implementations, the switchboard control plane 104 includes an access control module 150, a rate control module 152, a cost control module 154, a RAI control module 156, a control tower module 158, and a usage data module 160.

In some implementations, and as described in further detail herein, the one or more application servers 106 each execute one or more applications that consume one or more foundation models hosted in the model serving infrastructure 114. For example, an application can include a chatbot that provides responses generated by a foundation model responsive to user input to the chatbot. In some examples, the model benchmark source 108 provides benchmark data for one or more models hosted in the model serving infrastructure 114. Example benchmark data can include, but is not limited to, holistic evaluation of language model (HELM) scores 170 (which represent) and large model systems (LMSYS) scores 172. In some implementations, the RAI microservices 110 includes a bias estimator 180, a safety estimator 182, a privacy estimator 184, a security estimator 186, a robustness estimator 188, and a soundness estimator 190. In some implementations, the model serving infrastructure 114 represents an environment, such as a cloud computing environment, within which the foundation models are hosted. In some examples, the model serving infrastructure 114 can host the foundation models in different types of paradigms, which can include, without limitation, model-as-a-service (MaaS) models 190, specialized MaaS (SMaaS) 192, and self-deployed models 194.

In further detail, and with reference to the switchboard service 102, the orchestrator 120 implements top-level functionality to handle API requests to the switchboard service 102 (e.g., from applications executed on application server(s) 106) for comparing, routing, and the like, by orchestrating execution of a suite of granular services and functions. In some examples, the control validator 122 integrates with the switchboard control plane 104 to identify controls that are to be applied while making requests to endpoints for enforcing governance policies, for example. In some examples, the switchboard playground 124 is a service that enables browsing of a foundation model registry, sending of requests to the intelligent router 128 for model comparisons, for example, and composing of rules for executing foundation models in production scenarios. In some examples, the model registry 126 is a service that manages a pre-approved set of foundation models (e.g., registering endpoints of the foundation models) available for consumption and associated architectural configurations for scaling.

In some examples, the intelligent router 128 is a service that invokes appropriate model endpoints as directed by prescribed rules for a scenario. The intelligent router 128 can use the model connector 130, the model registry 126, the control validator 122, and other components. In some examples, the model connector 130 implements model specific mappings, parameters, and logic for communicating with the endpoints of selected foundation models. In some examples, the scoring engine 132 is a service that calculates a set of metrics that are used to compare the fit of a respective foundation model in a use-case scenario based on, for example, a collection of industry standard metrics and benchmarks. In some examples, metrics in the set of metrics represent how well a respective foundation model is expected to perform in a respective scenario. In some examples, the usage tracker 134 is a service that records data representative of use of foundation models. Example data can include requests submitted to and responses received from foundation models, technical parameters (e.g., latency, quota, availability, cost) in use of foundation models, and functional parameters (e.g., prompt complexity, domain, request type, accuracy) in use of foundation models.

In some examples, the model optimizer 136 is a service that can process one or more objectives set for an application (e.g., by an application developer) to cascade through multiple foundation models and identify a set of foundation models (e.g., one or more foundation models) that meet the objective(s). In some examples, the set of foundation models includes a ranking of the foundation models based on, for example, the least expensive foundation model in terms of technical resources expended. In some examples, the prompt assistant 138 is a service that generates a recommended prompt for interacting with a foundation model given a specific query (e.g., received from an application). For example, the prompt assistant 138 provides appropriate initial prompts for a use-case scenario using multiple techniques. In some examples, the policy engine 140 uses the set of metrics and a set of prompt tags to manage model execution rules for a production environment based on experiments, comparisons and benchmarks.

With regard to the switchboard control plane 104, the access controls 150, the rate controls 152, the cost controls 154, and the RAI controls 156 collectively define a set of policies that govern usage of the switchboard platform for respective tenants and/or respective use-case scenarios. For example, the access controls 150 can limit access to certain foundation models for specified tenants and/or use-case scenarios. As another example, the rate controls 152 can limit a frequency at which specified tenants and/or use-case scenarios can submit requests to foundation models. As another example, the cost controls 154 can limit costs that can be incurred (e.g., technical resources expended) for requests submitted by specified tenants and/or use-case scenarios to foundation models. As still another example, the RAI controls 156 can provide limitations based on RAI factors, discussed in further detail herein. In some examples, the control tower 158 provides visibility into usage of the switchboard platform per governance polices integrated with a cloud continuum control plane using the usage data 160.

The model benchmark source 108 can be queried to provide benchmark data for foundation models for respective domains and/or use-case scenarios (e.g., tasks to be performed). In some examples, a HELM score can be described as a benchmark for evaluating LLMs in performing respective tasks (e.g., text generation, translation, question answering, code generation, reasoning). In some examples, benchmark scores are provided by a third-party service that is queried by the switchboard service 102 (e.g., through an API). For example, a query can indicate a foundation model and a domain and/or a task and the model benchmarks source 108 returns scores responsive to the query. In some examples, LMSYS scores are provided by the LMSYS Organization.

The RAI microservices 110 can provide a set of services (e.g., the bias estimator 180, the safety estimator 182, the privacy estimator 184, the security estimator 186, the robustness estimator 188, the soundness estimator 190) to determine RAI metrics for respective foundation models. As represented in FIG. 1, example RAI metrics can include bias (e.g., societal bias, technical bias), safety, privacy, security, robustness, and soundness. In some examples, the set of RAI metrics is provided by one or more third-party services that are queried by the switchboard service 102 (e.g., through an API). For example, a query can indicate a foundation model and a prompt that would be submitted to the foundation model, and the set of RAI metrics is returned responsive to the query.

In some implementations, the prompt playground 112 enables users to build prompts using a set of prompt templates. For example, a library of prompt templates can be maintained, each prompt template providing a pattern that is specific to a foundation model. In some examples, the prompt playground 112 enables users to experiment with prompts and compare the responses across multiple foundation models. In this manner, users can consider the quality of responses and quantitatively determine cost and latency to use of respective foundation models.

In some implementations, the model serving infrastructure 114 represents the technical infrastructure(s), in which the foundation models are hosted. Example infrastructures include cloud computing platforms (e.g., Amazon Web Services (AWS), Google Cloud). In general, the switchboard service 102 submits requests to (e.g., through an API) and receives responses from one or more foundation models executing within the model serving infrastructure 114. For example, a request can include a prompt and an endpoint for a foundation model that is to be queried using the prompt, and the response includes content (e.g., text) generated by the foundation model. In some examples, the request is sent in response to a request received by the switchboard service 102 from an application (e.g., executing on the applications server 106), and the response from the foundation model is returned to the application.

Figure 2:
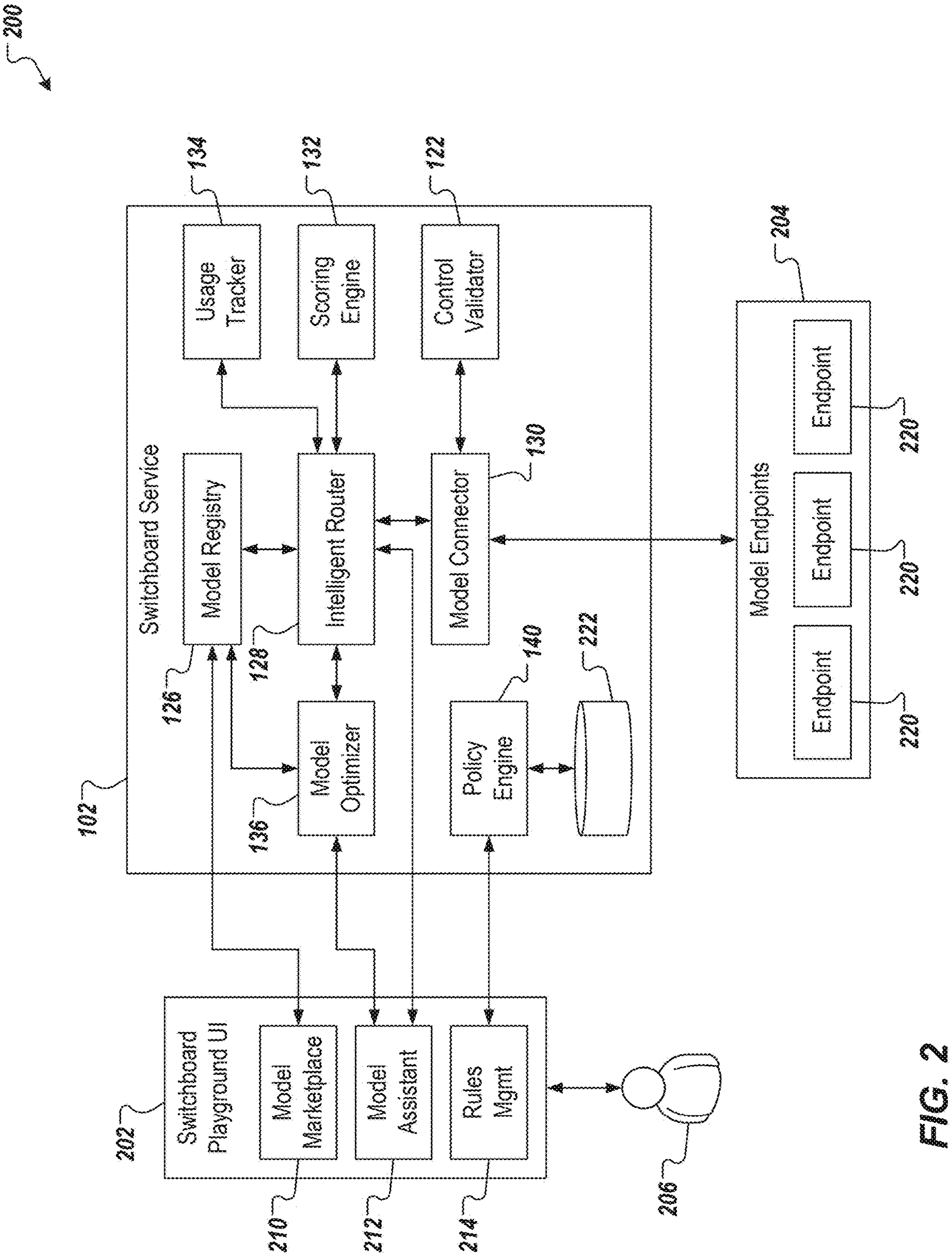
FIG. 2 depicts an example pre-production environment in accordance with implementations of the present disclosure.

FIG. 2 depicts an example pre-production environment 200 in accordance with implementations of the present disclosure. Here, pre-production represents a phase prior to applications using the switchboard platform to query foundation models. In the example of FIG. 2, the example pre-production environment 200 includes the switchboard service 102, a switchboard playground user interface (UI) 202, and model endpoints 204. In some examples, the switchboard playground UI 202 is a UI that is exposed by the switchboard playground 124 (see FIG. 1) and enables one or more users 206 to interact with components of the switchboard service 102, as described in further detail herein. In the example of FIG. 2, the switchboard playground UI 202 includes a model marketplace module 210, a model assistant module 212, and a rules management module 214. The model endpoints 204 includes endpoints 220 of the foundation models that are accessible through the switchboard platform of the present disclosure. Here, the model endpoints 204 are collectively provisioned in the model serving infrastructure 114 of FIG. 1. In the example of FIG. 2, the switchboard service 102 includes a policy registry 222. In some examples, the endpoints 220 can be represented in connection data that is used when sending requests to the foundation models.

In some implementations, the one or more users 206 (e.g., developers, AI engineers) interact with the model marketplace module 210 to browse foundation models that are available through the switchboard platform. In some examples, the model marketplace module 210 retrieves information descriptive of the foundation models from the model registry 126. In some examples, the foundation models included in the model registry 126 include pre-approved foundation models with configuration and access to the foundation models be managed by switchboard administrators. In some examples, the users 206 can use the model assistant module 212 to prompt a subset of foundation models that are being considered for one or more specified tasks (e.g., in one or more use cases). In some examples, the model assistant module 212 calls the foundation model(s) through the intelligent router 128 and receives response(s) from the foundation model(s). In some examples, a set of metrics is provided for each foundation model.

In some implementations, the users 206 can use the model assistant module 212 to define criteria (e.g., defining objectives) that foundation models are expected to meet. Example criteria can include, without limitation, technical parameters (e.g., latency, quota, availability, cost) and/or functional parameters (e.g., RAI metrics) that are expected to be met. The model assistant module 212 can call the model optimizer 136 with the criteria and, in response, the model optimizer 136 makes calls to the foundation models through the intelligent router 128. In some examples, the calls are made in an order defined by cost of respective foundation models (e.g., lowest cost foundation model is queried first). In some examples, the model optimizer 136 returns a sub-set of foundation models that achieve the criteria. In some examples, foundation models in the sub-set of foundation models include the k-lowest cost foundation models in meeting the criteria (e.g., cost in term of technical resources expended and/or monetary cost to call the foundation model).

In some implementations, the intelligent router 128 queries the foundation models through the model connector 130 using the respective endpoints 220. In some examples, the intelligent router 128 validates the controls for each foundation model using the control validator 122.

In some examples, the control validator 122 validates that the user (or application querying a foundation model) has access to the particular foundation model. In some examples, the control validator 122 ensures that the application is bounded by the rate-limiting thresholds and ensures that the application is bounded by prompt security thresholds (i.e., the prompt is not a threat in terms of prompt injection/prompt security). In some examples, users can configure to add one or more RAI thresholds (e.g., toxicity/bias) that can be validated. In some examples, the intelligent router 128 uses the scoring engine 132 to calculate configured key performance indicators (KPIs) and metrics for each foundation model, which are returned the model assistant module 212.

In some implementations, the users 206 can interact with the rules management module 214 to define a set of policies (e.g., one or more rules) that codify the use of foundation models based on, for example and without limitation, domain, application, intent, task, modality. For example, a first set of foundation models can be white-listed (or black-listed) for a first domain and a second set of foundation models can be white-listed (or black-listed) for a second domain, where the second set of foundation models is different from the first set of foundation models. Sets of foundation models can be similarly defined for each of domain, application, intent, task, modality, and the like, and for any appropriate combination of these. For example, a set of foundation models can be defined for a specified domain, application, and task. In some examples, the rules management module 214 uses the policy engine 140 to store or update the policies in the policy registry 222 (e.g., for respective applications). In some examples, a user 206 (e.g., a governance lead) can review policies in the policy registry 222 and can approve of one or more policies. In response to an approval, the policy is promoted for use in production.

Figure 3:
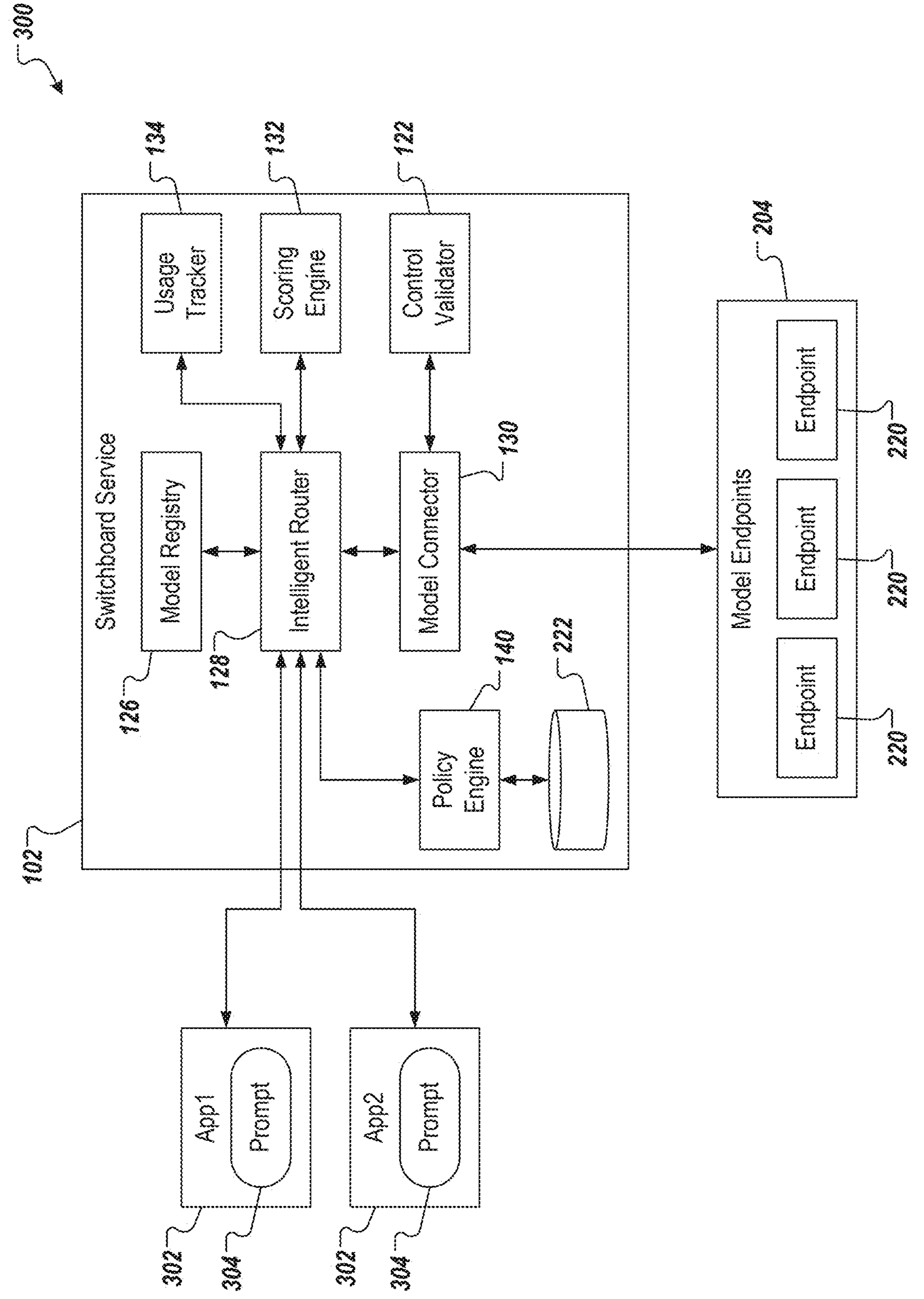
FIG. 3 depicts an example production environment in accordance with implementations of the present disclosure.

FIG. 3 depicts an example production environment 300 in accordance with implementations of the present disclosure. Here, production represents a phase, during which applications use the switchboard platform to query foundation models. In the example of FIG. 2, the example production environment 300 includes the switchboard service 102, the model endpoints 204, and one or more applications 302. As described in further detail herein, the applications 302 can each submit one or more prompts 304 (e.g., queries) that are routed to respective foundation models through the switchboard service 102. In some examples, one or more of the applications 302 is executed in one or more of the application servers 106 of FIG. 1. Example applications can include a finance application, a marketing application, and a customer application (e.g., chatbot).

In further detail, an application 302 submits a request (e.g., including a prompt) to the intelligent router 128 (e.g., through the API). In some examples, the intelligent router 128 queries the policy engine 140 for a foundation model that conforms to an applicable policy, if any. For example, the query can include policy parameters (e.g., a tenant identifier (uniquely identifying a tenant operating the application 302), an application identifier (uniquely identifying the application 302), a domain, an intent, a task, and a modality) that define a policy that is to be applied to the query. In some examples, the policy engine 140 can identify a set of foundation models that conform to the policy provided with the query. In some examples, a hierarchical search can be used for identifying foundation models that conform to the policy with a fallback to a default model (e.g., specified for application, domain, and/or tenant). The intelligent router 128 queries the model registry 126 to retrieve details of model configuration and endpoints for the foundation model. The intelligent router 128 uses the model connector 130 to determine the parameters and logic for communicating with the API endpoints of the foundation model (e.g., using model-specific mappings stored in the model connector 130) and connects to the specific endpoint to query the foundation model using the prompt provided in the request from the application 302. A response is returned from the foundation model, which is provided to the application 302. In some examples, the intelligent router 128 can score the response using the scoring engine 132. In some examples, the intelligent router 128 logs the request with details for tracking purposes using the usage tracker 134.

Figure 4:
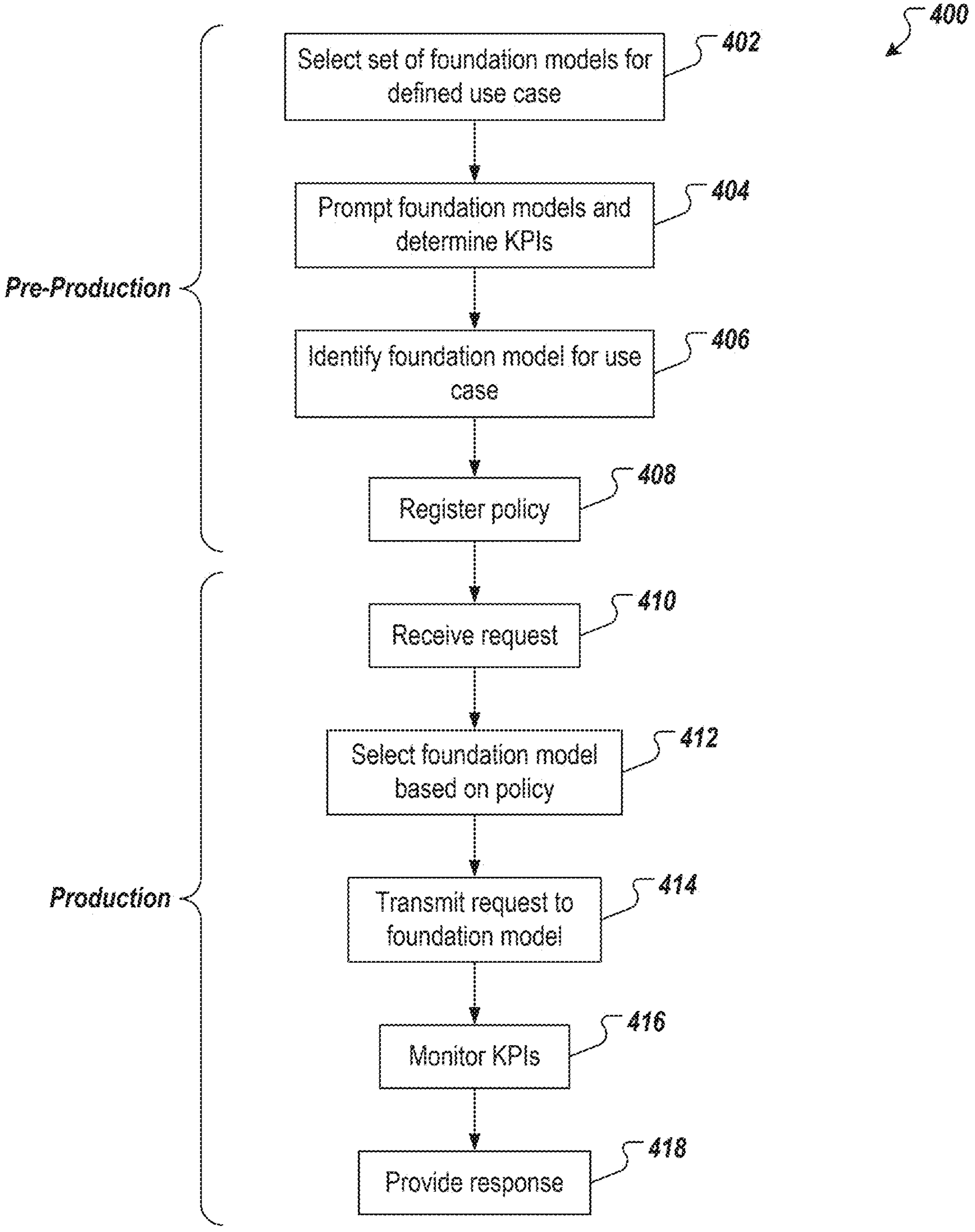
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

In a pre-production phase, a set of foundation models is selected for a defined use case (402). For example, and as described herein, with reference to FIG. 2, a user 206 can interact with the model marketplace module 210 to define a use case and determine a set of foundation models that could be applied for the use case. In some examples, the use case can include a task that is to be executed (e.g., by an application 302 of FIG. 3) based on a response received from a foundation model. An example task can include, but is not limited to, providing a textual response generated by a foundation model in response to user input (e.g., a textual response provided through a chatbot in response to user input to the chatbot). In view of this example task, the set of foundation models can include LLMs that generate text in response to prompts. In some examples, foundation models in the set of foundation models are determined using the model registry 126. In some examples, the user 206 can define criteria that foundation models are expected to meet (e.g., cost, latency, performance, RAI minimum score(s)).

Foundation models in the set of foundation models are prompted and KPIs are determined (404), and a sub-set of foundation models is defined for the use case (406). In some examples, the foundation models are prompted using prompts that are representative of a use case, for which a foundation model is to be selected (e.g., user input that could be received through a digital assistant). In some examples, and as described herein, the user 206 can interact with the model assistant 212, which can call foundation models in the set of foundation models through the intelligent router 128. In some examples, the foundation models are called in a rank order, the lowest cost foundation model being call first (e.g., lowest financial cost (cost per API call), lowest cost in terms of technical resource expended). In some examples, responses are returned by the foundation models with a set of metrics (e.g., cost, latency). The sub-set of foundation models can be provided as the k-lowest cost foundation models in meeting the criteria (e.g., cost in term of technical resources expended and/or monetary cost to call the foundation model).

A policy is registered (408). For example, and as described herein, a user 206 can interact with the rules management module 214 to define a set of policies (e.g., one or more rules) that codify the use of foundation models based on, for example and without limitation, domain, application, intent, task, modality. In some examples, the rules management module 214 uses the policy engine 140 to store or update the policies in the policy registry 222 (e.g., for respective applications). In some examples, a user 206 (e.g., a governance lead) can review policies in the policy registry 222 and can approve of one or more policies. In response to an approval, the policy is promoted for use in production.

During a production phase, a request is received (410) and a foundation model is selected based on a policy (412). For example, and as described herein, an application 302 submits a request (e.g., including a prompt) to the intelligent router 128 (e.g., through the API). In an example use case of a digital assistant, the request can include user input that is input to the digital assistant. In some examples, the intelligent router 128 queries the policy engine 140 for a foundation model that conforms to an applicable policy, if any. For example, the query can include policy parameters (e.g., a tenant identifier (uniquely identifying a tenant operating the application 302), an application identifier (uniquely identifying the application 302), a domain, an intent, a task, and a modality) that define a policy that is to be applied to the query. In some examples, the policy engine 140 can identify foundation models in the sub-set of foundation models that conform to the policy provided with the query. In some examples, a hierarchical search can be used for identifying foundation models in the sub-set of foundation models that conform to the policy with a fallback to a default model (e.g., specified for application, domain, and/or tenant).

A request is transmitted to the foundation model (414). For example, and as described herein, the intelligent router 128 queries the model registry 126 to retrieve details of model configuration and connection data for the foundation model. In some examples, the connection data represents an endpoint of the foundation model. The intelligent router 128 uses the model connector 130 to determine the parameters and logic for communicating with the endpoint of the foundation model (e.g., using model-specific mappings stored in the model connector 130) and connects to the endpoint to query the foundation model using the prompt provided in the request from the application 302. A response is returned from the foundation model, which is provided to the application 302. One or more KPIs are monitored (416). For example, and as described herein, the intelligent router 128 can provide KPIs for the response using the scoring engine 132 (e.g., cost, latency of the response). In some examples, the intelligent router 128 logs the request with details for tracking purposes using the usage tracker 134. A response is provided (418). For example, and as described herein, the intelligent router 128 returns the response to the application 302 that has submitted the request.

Implementations of the present disclosure provides technical solutions to multiple technical problems that arise in the context of applications interacting with multiple foundation models (in a so-called multi-model GAI paradigm). For example, the switchboard platform of the present disclosure optimizes use of technical resources (processors, memory, bandwidth) with respect to context-specific objectives (application tasks) to achieve, for example, cost reduction (e.g., in terms of technical resources expended) and/or improvements in UX (e.g., reduced latency). As another example, the switchboard platform of the present disclosure enables dynamic switching between foundation models based on multiple factors (e.g., prompt intent, resource cost, latency, domain).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for a switchboard platform to enable multiple disparate applications to query multiple disparate foundation models, the method comprising:

receiving, by an intelligent router of the switchboard platform, a first request from an application, the first request comprising at least a portion of a prompt and a set of policy parameters;

selecting, by the intelligent router, a foundation model of a sub-set of foundation models at least partially based on at least one policy parameter in the set of policy parameters, wherein selecting the foundation model of the sub-set of foundation models comprises applying a policy responsive to the first request, and the foundation model conforming to the policy;

determining, from a model registry of the switchboard platform, connection data for the foundation model;

transmitting, by the intelligent router and through a model connector of the switchboard platform, a second request for processing by the foundation model, the second request being transmitted using the connection data and comprising at least a portion of the prompt;

receiving, by the intelligent router, a response from the foundation model; and transmitting the response to the application.

2. The computer-implemented method of claim 1, wherein the set of policy parameters comprises one or more of a tenant identifier, an application identifier, a domain, an intent, a task, and a modality.

3. The computer-implemented method of claim 1, further comprising, during a pre-production phase:

defining criteria; and selecting foundation models of a set of foundation models for inclusion in the sub-set of foundation models based on the criteria.

4. The computer-implemented method of claim 3, wherein selecting the foundation models of the set of foundation models for inclusion in the sub-set of foundation models based on the criteria comprises:

transmitting requests to the foundation models in the set of foundation models in a first rank order based on cost to query; and determining a second rank order of foundation models that meet the criteria, at least a portion of the foundation models in the second rank order of foundation models being included in the sub-set of foundation models.

5. The computer-implemented method of claim 1, wherein the connection data comprises an endpoint of the foundation model in a model serving infrastructure.

6. The computer-implemented method of claim 1, wherein the set of foundation models comprises large language models (LLMs).

7. A system, comprising:

one or more processors; and a computer-readable storage device coupled to the one or more processors and having instructions stored thereon which, when executed by the one or more processors, cause the one or more processors to perform operations for a switchboard platform to enable multiple disparate applications to query multiple disparate foundation models, the operations comprising:

receiving, by an intelligent router of the switchboard platform, a first request from an application, the first request comprising at least a portion of a prompt and a set of policy parameters;

selecting, by the intelligent router, a foundation model of a sub-set of foundation models at least partially based on at least one policy parameter in the set of policy parameters, wherein selecting the foundation model of the sub-set of foundation models comprises applying a policy responsive to the first request, and the foundation model conforming to the policy;

determining, from a model registry of the switchboard platform, connection data for the foundation model;

transmitting, by the intelligent router and through a model connector of the switchboard platform, a second request for processing by the foundation model, the second request being transmitted using the connection data and comprising at least a portion of the prompt;

receiving, by the intelligent router, a response from the foundation model; and transmitting the response to the application.

8. The system of claim 7, wherein the set of policy parameters comprises one or more of a tenant identifier, an application identifier, a domain, an intent, a task, and a modality.

9. The system of claim 7, wherein operations further comprise, during a pre-production phase:

defining criteria; and selecting foundation models of a set of foundation models for inclusion in the sub-set of foundation models based on the criteria.

10. The system of claim 9, wherein selecting the foundation models of the set of foundation models for inclusion in the sub-set of foundation models based on the criteria comprises:

transmitting requests to the foundation models in the set of foundation models in a first rank order based on cost to query; and determining a second rank order of foundation models that meet the criteria, at least a portion of the foundation models in the second rank order of foundation models being included in the sub-set of foundation models.

11. The system of claim 7, wherein the connection data comprises an endpoint of the foundation model in a model serving infrastructure.

12. The system of claim 7, wherein the set of foundation models comprises large language models (LLMs).

13. A non-transitory computer-readable storage media coupled to the one or more processors and having instructions stored thereon which, when executed by the one or more processors, cause the one or more processors to perform operations for a switchboard platform to enable multiple disparate applications to query multiple disparate foundation models, the operations comprising:

receiving, by an intelligent router of the switchboard platform, a first request from an application, the first request comprising at least a portion of a prompt and a set of policy parameters;

selecting, by the intelligent router, a foundation model of a sub-set of foundation models at least partially based on at least one policy parameter in the set of policy parameters, wherein selecting the foundation model of the sub-set of foundation models comprises applying a policy responsive to the first request, and the foundation model conforming to the policy;

determining, from a model registry of the switchboard platform, connection data for the foundation model;

transmitting, by the intelligent router and through a model connector of the switchboard platform, a second request for processing by the foundation model, the second request being transmitted using the connection data and comprising at least a portion of the prompt;

receiving, by the intelligent router, a response from the foundation model; and transmitting the response to the application.

14. The non-transitory computer-readable storage media of claim 13, wherein the set of policy parameters comprises one or more of a tenant identifier, an application identifier, a domain, an intent, a task, and a modality.

15. The non-transitory computer-readable storage media of claim 13, wherein operations further comprise, during a pre-production phase:

defining criteria; and selecting foundation models of a set of foundation models for inclusion in the sub-set of foundation models based on the criteria.

16. The non-transitory computer-readable storage media of claim 15, wherein selecting the foundation models of the set of foundation models for inclusion in the sub-set of foundation models based on the criteria comprises:

transmitting requests to the foundation models in the set of foundation models in a first rank order based on cost to query; and determining a second rank order of foundation models that meet the criteria, at least a portion of the foundation models in the second rank order of foundation models being included in the sub-set of foundation models.

17. The non-transitory computer-readable storage media of claim 13, wherein the connection data comprises an endpoint of the foundation model in a model serving infrastructure.

* * * * *